United States Patent [19]

Eaton

[11] Patent Number: 5,136,484
[45] Date of Patent: Aug. 4, 1992

[54] SUBMERSIBLE TAIL LIGHT FOR USE ON A BOAT

[76] Inventor: Kenneth C. Eaton, 1114 Cathcart Boulevard, Sarnia, Ontario, Canada, N7S 2H5

[21] Appl. No.: 764,625

[22] Filed: Sep. 24, 1991

[51] Int. Cl.$^5$ ............................................. B60Q 1/44
[52] U.S. Cl. ...................................... 362/61; 362/83; 362/83.3; 362/267
[58] Field of Search ............... 362/61, 80, 83.2, 82, 362/83, 83.3, 78, 101, 154, 294, 353, 267

[56] References Cited

U.S. PATENT DOCUMENTS

| | | | |
|---|---|---|---|
| 4,360,862 | 11/1982 | Strasser et al. | 362/80 |
| 4,361,864 | 11/1982 | Spiro | 362/80 |
| 4,771,369 | 9/1988 | Hymer | 362/80 |
| 5,061,121 | 10/1991 | Cummingham et al. | 362/61 |

Primary Examiner—Ira S. Lazarus
Assistant Examiner—Sue Hagarman
Attorney, Agent, or Firm—Daryl W. Schnurr

[57] ABSTRACT

A submersible tail light for use on a boat trailer has a transparent inner shell contained within a housing. The bottom of the inner shell and of the housing is at least partially open and can be covered by a splash plate containing perforations to allow water to drain from the tail light when it is removed from the water. A bulb and socket are supported in the shell by a bracket extending from the bottom of the shell. The inner shell is formed in one piece of impervious transparent material and is air-tight except for the bottom. The housing contains one or more lenses and the bulb or bulbs are centered on the shell. No seals or adhesives are required. The housing protects the inner shell from damage. With previous submersible tail lights, the lens is mounted on the housing using adhesives or seals to obtain an air-tight relationship. When the tail light is no longer air-tight because of the deterioration of the seals or because of damage, the submersible feature becomes inoperable.

5 Claims, 7 Drawing Sheets

SUBMERSIBLE TAIL LIGHT FOR USE ON A BOAT

BACKGROUND OF THE INVENTION

1. Field of the Invention

This invention relates to a submersible tail light for use on a boat trailer and the like and in particular to a submersible tail light that does not require the use of any seals or adhesives.

2. Description of the Prior Art

Submersible tail lights are known. However, previous tail lights such as the one described in U.S. Pat. No. 3,106,349 has a housing with an open bottom, where the housing is air tight and includes a lens that is sealed within the wall of the housing. Further, if the lens becomes cracked, air will leak out of the housing as the tail light is being submersed and water will contact the bulb and socket. Unfortunately, seals deteriorate with time and eventually, the housing will leak around the lens. This will cause the water to contact the bulb and the bulb will often shatter. Submersible tail lights are desirable to prevent water from contacting the bulb and/or the socket. If water contacts a hot bulb, the bulb will burst. If water continuously contacts the socket, the socket will corrode and will ultimately become unusable. Other known submersible tail lights do not allow the bulb to be changed without opening sealed compartments or do not allow the bulb to be changed readily or do not protect the air chamber surrounding the bulb from damage, or cannot be added to existing tail lights to change them into submersible tail lights. For tail lights of boat trailers and the like, the tail light must either be submersible or the tail lights must be disconnected before launching or mounting a boat on the trailer. Often the operator of the trailer forgets to disconnect the tail lights and the bulbs burst. Then, the operator often operates the trailer upon a highway with the tail lights inoperable. Since the ramp at the boat launch is on a slope, the brake lights are used extensively as the trailers move down the ramp. This increases the likelihood that the bulb will burst upon being contacted by water. Even if the lights are disconnected from the power source, the contact between the water and the socket will cause the socket to corrode and eventually the tail light will cease to operate. With submersible tail lights, these problems can be avoided so long as the submersible tail light is in proper operating condition. Unfortunately, with previous submersible tail lights, the tail lights fail prematurely and the submersible feature becomes inoperable due to the housing being damaged or the tail light becoming cracked or the seals or adhesives used within the housing failing.

SUMMARY OF THE INVENTION

It is an object of the present invention to provide a submersible tail light that is reliable and durable and does not use seals or adhesives. It is a further object of the present invention to provide a submersible tail light that can easily be adopted for use with existing tail lights to change them to submersible tail lights.

A submersible tail light for use on a boat trailer and the like has a transparent inner shell with a top, sides and bottom. The bottom is at least partially open to ambient air and the shell is formed in one piece of impervious material and is air-tight, except for the bottom, without the use of seals or adhesives. The housing has a top, sides and bottom and the bottom is at least partially open to the ambient air. The housing is large enough so that the shell will fit within it, said housing containing at least one lens. There are support means for supporting at least one bulb and socket together with fastening means to mount said bulb and socket within said shell in an upper portion thereof. There are fastening means to mount the tail light on the trailer. The socket is appropriately wired by wires extending from the socket through the bottom of the shell and the bottom of the housing. The bulb and socket are located sufficiently above the opening so that when the light is immersed in water, the shell forms an air pocket in an upper portion thereof around the bulb and socket to prevent the bulb and socket from being immersed in water.

DESCRIPTION OF A PREFERRED EMBODIMENT

Figure 1:
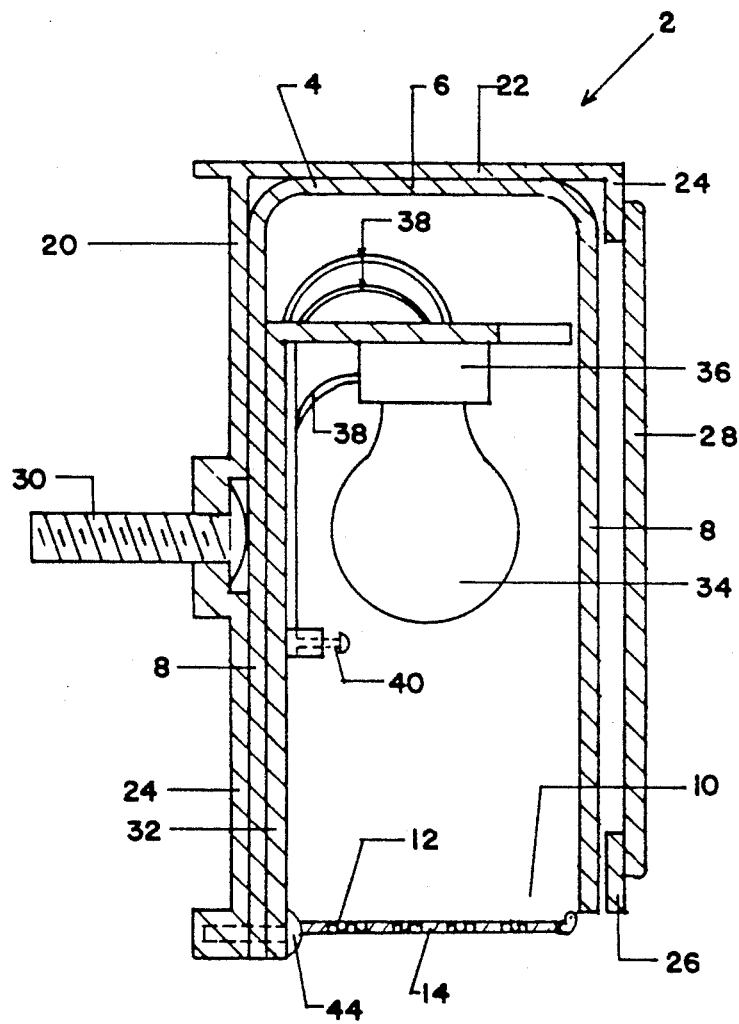
FIG. 1 is a sectional side view of a submersible tail light.
Figure 2:
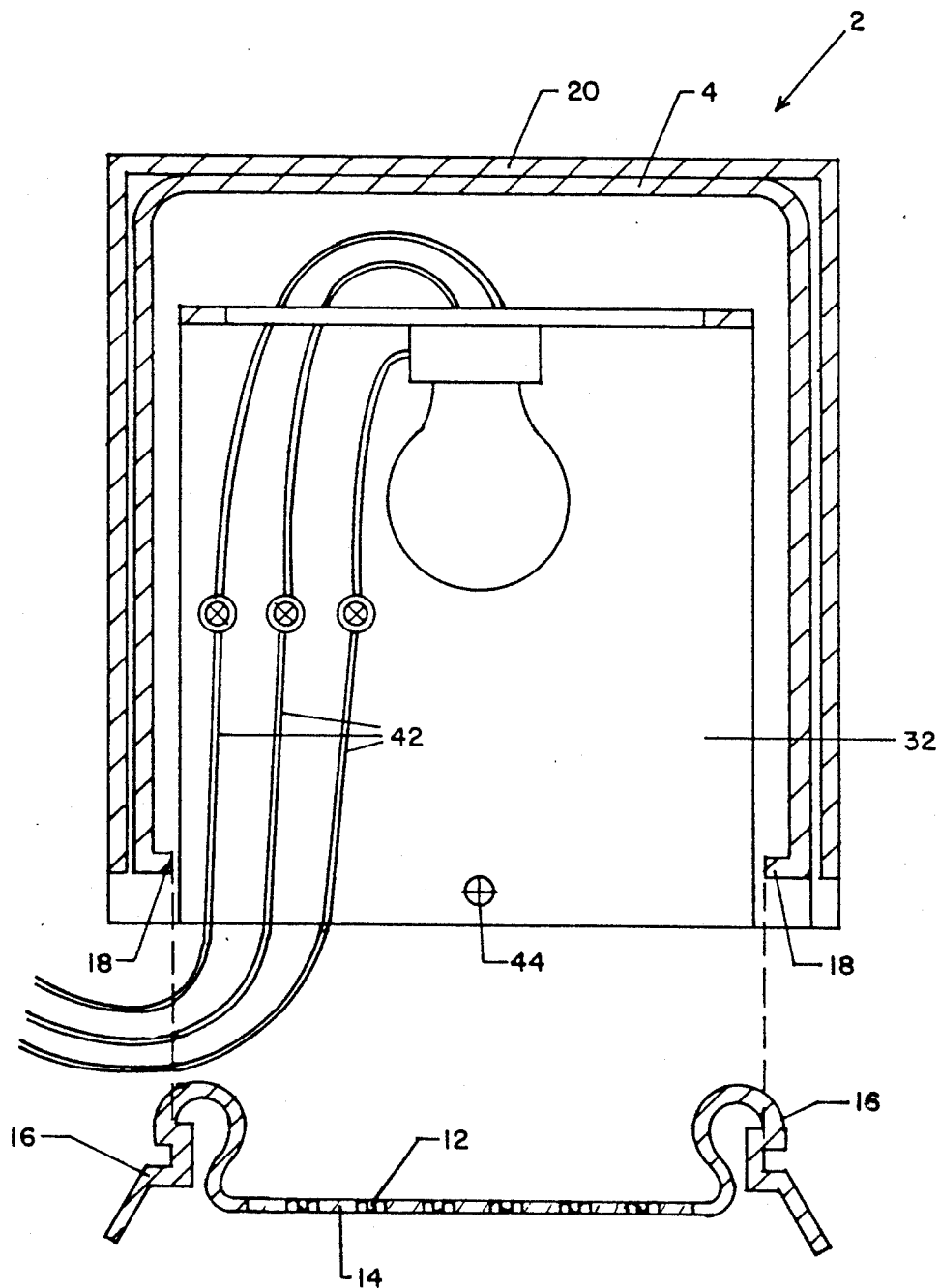
FIG. 2 is a sectional front view of the tail light of FIG. 1.
Figure 3:
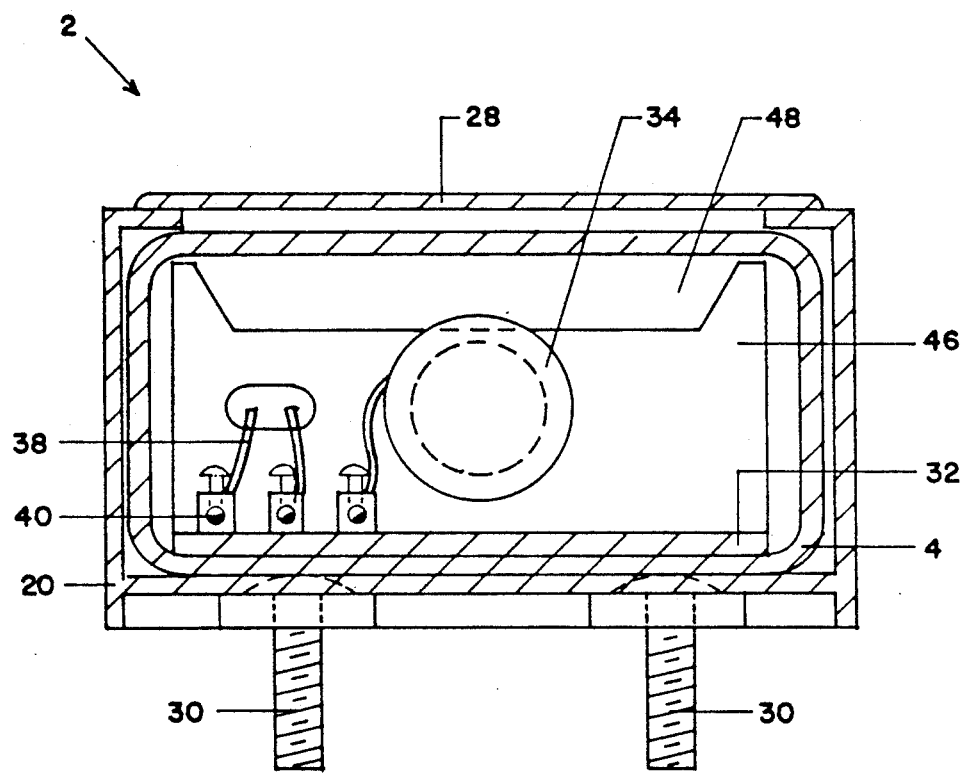
FIG. 3 is a sectional bottom view of the tail light of FIG. 1.

In FIGS. 1, 2 and 3, there is shown sectional side, front and bottom views of a submersible tail light 2 having an inner shell 4 with a top 6, sides 8 and a bottom 10. The bottom 10 can be completely open to ambient air or, as shown, only partially open to ambient air through perforations 12 and plate 14. The plate 14 has clips 16 located along two opposing edges corresponding to a flange 18 along a lower edge of two opposing sides of the shell 4 so that the plate 14 can easily be clipped into the position shown in FIG. 1 or removed as shown in FIG. 2.

The inner shell 4 is transparent and is formed in one piece of impervious material, preferably plastic. Further, the plastic is preferably non-rigid so that it will bend somewhat without breaking or cracking. The shell 4 is air-tight except for the bottom 10 and does not require the use of seals or adhesives.

A housing 20 has a top 22, sides 24 and bottom 26. The bottom 26 of the housing 20 is either completely open, or is partially open, as shown in FIGS. 1 and 2 by the perforated plate 14. The housing 20 is large enough so that the shell 4 will fit within it. One side 24 of the housing 22 contains a red tail light lens 28. The lens 28 can be attached to the side 24 of the housing 22 by any conventional means. While adhesives could be used to affix the lens 28 to the housing 22, it is not necessary that the lens be sealed relative to the housing. At the side 24 opposite to the lens 28, there is located two bolts 30 for fastening the housing 20 and thereby the entire tail light 2 to a boat trailer and the like (not shown).

Within the shell 4, is located an elongated L-shaped bracket 32, which provides support means for a bulb 34 and socket 36. The socket 36 is wired by three separate wires 38 to three terminals 40 mounted on the bracket 32, just beneath the bulb 34 when the tail light 2 is in an upright position. The terminals 40 are mounted at a sufficiently high level on the bracket 32 in that they will not be contacted by water when the tail light is submersed to a reasonable level through normal use of a boat trailer. As shown in FIG. 2, extending from each of the terminals 40 are wires 42, which are connected to a power source (not shown) located in a towing vehicle (not shown). The wires 42 extend through the bottom 10 of the shell 4 so that it is not necessary to seal the opening through which the wires extend. When the perforated plate 14 is in position on the bottom 10, the plate contains a suitable opening (not shown) to accommodate the wires.

The bracket 32 and the shell 4 are affixed to the housing 20 by a screw 44 which extends to the bracket 32 and the shell 4 and into the housing 20. An upper portion 46 of the bracket 32 has an area 48 cut away so that light from the bulb reaches the top of the lens.

Figure 4:
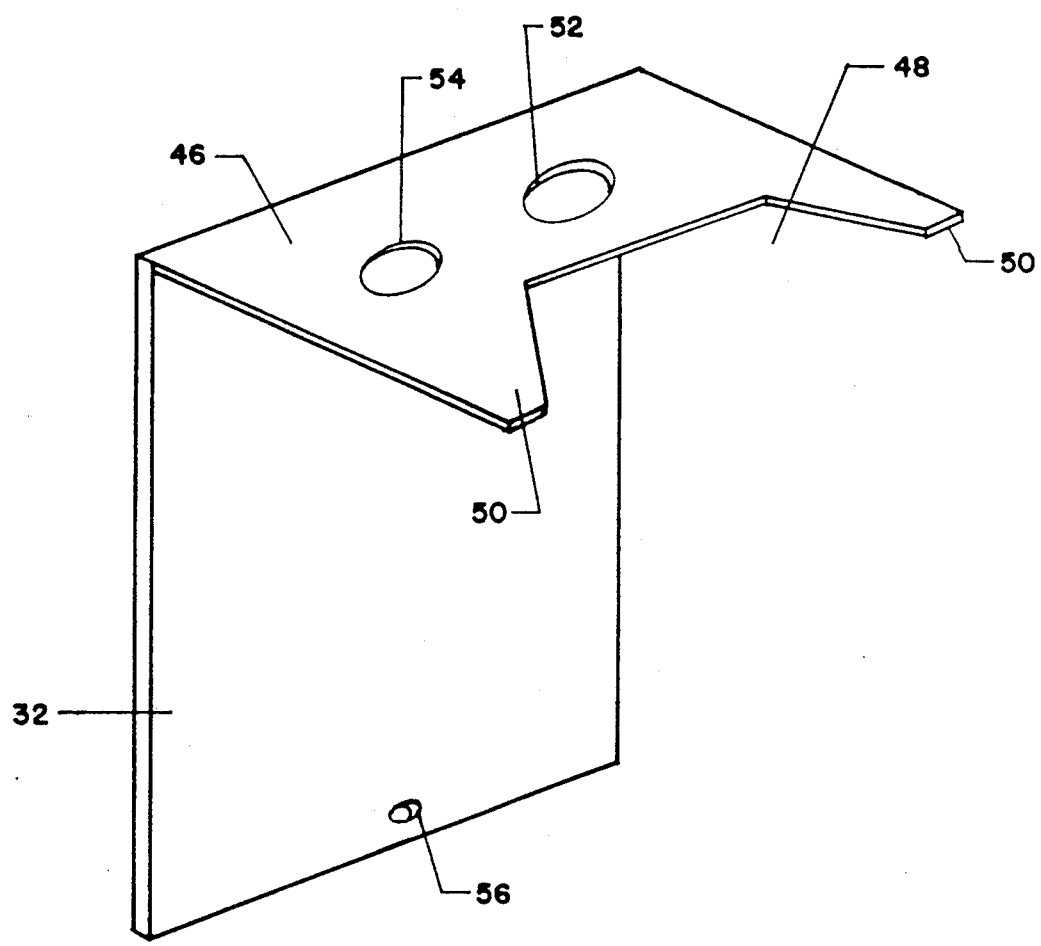
FIG. 4 is a perspective view of a bracket used in the tail light.

The purpose of the perforated plate 14 is to prevent water from being splashed into an interior of the shell 4 where it might contact the bulb, socket or terminals. The perforations 12 allow water to enter the interior of the shell 4 in a controlled even manner. The perforations 12 also allow the simple and complete drainage of the shell 4 when the tail light 2 is removed from the water. In FIG. 4, the L-shaped bracket 32 is shown with the upper portion 46 and cut away portion 48. Projections 50 are located on either side of the cut away portion 48 so that the bulb 34 will not contact a side of the shell 4 if the bracket 32 becomes loose or bent. Also, the size of the bracket relative to the shell and the projections keep the bulb centered on the lens if the bracket becomes loose or bent. The socket is located above the bulb s that the socket is located further from the bottom of the shell when the bulb is centered on the lens. At an approximate center of the bracket 32, there is located an opening 52 for receiving the socket 36. A second opening 54 in the upper portion 46 provides a passageway between the socket (not shown in FIG. 4) and the terminals (not shown in FIG. 4) for the wires 38 (not shown in FIG. 4). Near a bottom of the bracket 2, a third opening 56 is located to receive the screw 44 (not shown in FIG. 4). The bracket 32 is designed to fit snugly within the shell 4 so that it will remain in an essentially upright position even if the screw 44 becomes loose.

The bracket 32 is shown for supporting one bulb further openings could be located in the bracket 32 for an additional bulb or bulbs.

Figure 5:
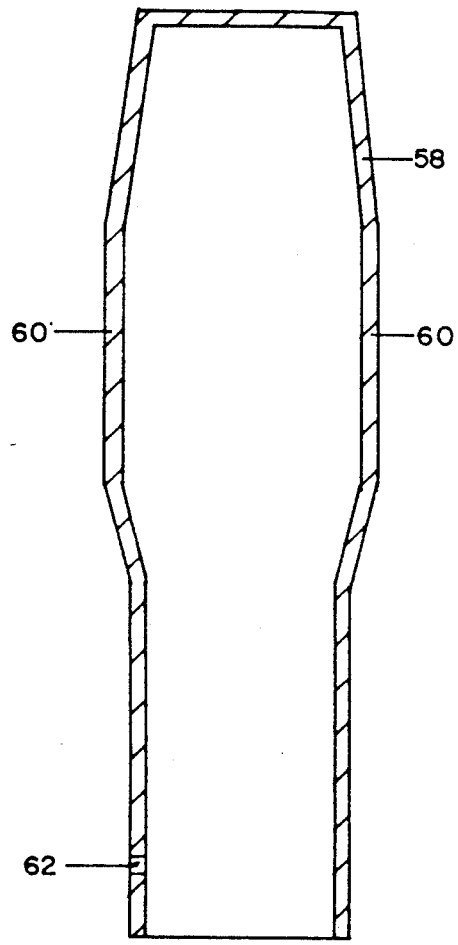
FIG. 5 is a sectional side view of a further embodiment of an inner shell.

In FIG. 5, there is shown a sectional side view of a shell 58 which has a different shape than the shell 4 but functions in the same manner. The shell 58 contains an opening 62 for receiving the screw 44 (not shown in FIG. 5). The shell 58 is narrower than the shell 4 and preferably has flexible sides 60. The shell 58 is designed to be used as part of a kit to make existing tail lights submersible. The shell 58 is inserted into an existing tail light housing. If the opening of the housing is too narrow, the sides 60 will bend inward until the housing is inserted and then they will expand to the position shown in FIG. 5. The expanded position is important so that the bulb 34 will not have any direct contact with the sides 60 when the bulb is inserted. Usually, the opening in the bottom of a conventional tail light housing (for the license plate lens) will be smaller than a cross-sectional side of the housing itself. When the existing tail light housing does not have an opening in the bottom, it will be necessary to cut an opening of appropriate size.

Figure 6:
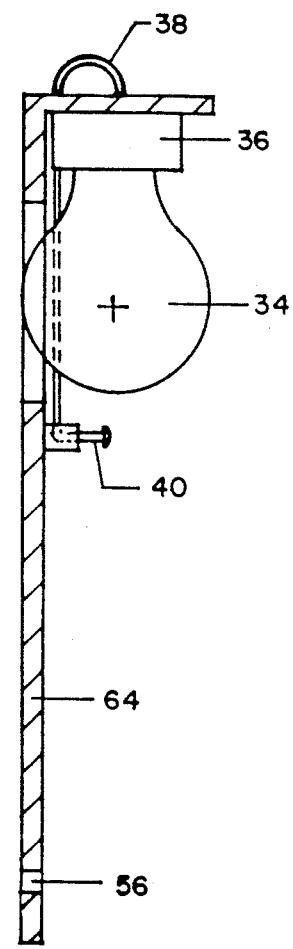
FIG. 6 is a sectional side view of a bracket and bulb used in the shell of FIG. 5.

Corresponding to the housing 58 is a support bracket 64 which contains an opening 56 to receive the screw 44 (not shown in FIG. 6). The same reference numerals are used for the bulb 34, the socket 36, the wires 38 and the terminals 40 of the support 64. It should be noted that the bracket 64 is designed so that the depth (from front to back) of the bracket is equal to the width of the bulb (from side to side).

Figure 7:
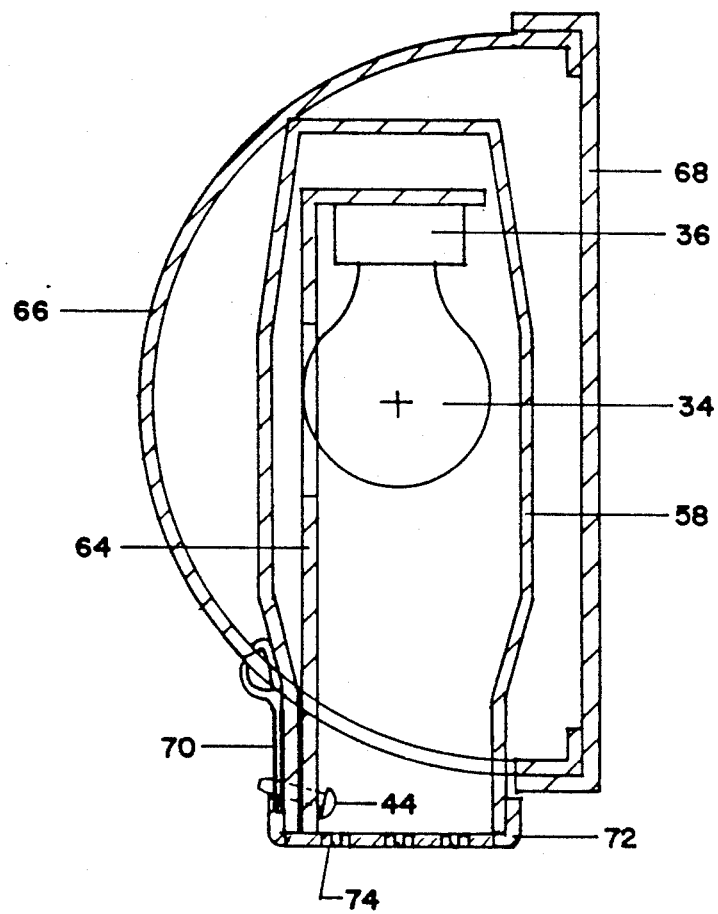
FIG. 7 is a sectional side view of the shell and support of FIGS. 5 and 7 in a conventional round back tail light assembly.
Figure 9:
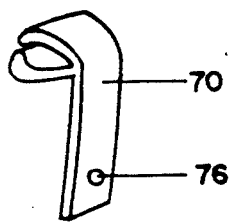
FIG. 9 is a perspective view of a clip used in FIG. 8 to attach the shell and support.

In FIG. 7, the shell 58 and support 64 are shown to be mounted within a conventional round back tail light housing 66 having a lens 68. The screw 44 affixes the support 64 and shell 58 to the housing 66 by means of a clip 70. A plate 72 containing perforations 74 is mounted across the bottom of the housing 58. A perspective view of the clip 70 is shown in FIG. 9. It can be seen that the clip 70 has an opening 76 for receiving the screw 44 (not shown in FIG. 9).

Figure 8:
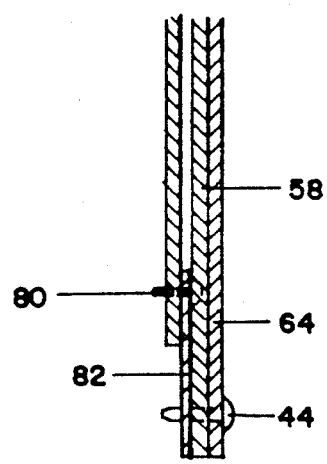
FIG. 8 is a partial sectional side view of the shell of FIG. 5 and support of FIG. 7 mounted in a conventional flat back tail light assembly.
Figure 10:
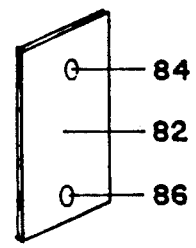
FIG. 10 is a perspective view of a plate used in FIG. 9 to attach the shell and support.

In FIG. 8, there is shown a partial sectional side view of a flat back tail light housing 78. A screw 80 attaches a rectangular flat plate 82 to the housing 78. The plate 82 extends beneath the housing 78 and the screw 44 attaches the support 64 and the shell 58 to the plate 82 and holds the support and shell within the housing 78. In FIG. 10, it can be seen that the plate 82 has an upper opening 84 for receiving the screw 80 (not shown in FIG. 10) and a lower opening 86 for receiving the screw 44 (not shown in FIG. 10). Since the shell 58 of a flexible plastic material and the support 64 can be made of a rigid plastic material, if the shell and support are too long for the existing conventional housing in which they are to be inserted, a bottom portion of the shell and support can be cut off. In some installations, it will be necessary to drill a new opening 56 in the bracket to receive the screw 44.

Preferably, the shell is made of one piece of material with no joints or holes except for the one opening in the bottom for the screw 44. One advantage of the submersible tail light of the present invention is that once the shell has been inserted into the housing, it is protected from damage. When trailers are being backed into position on a boat ramp or the like, it is not uncommon for the trailer to strike guide posts and other immovable objects, which can damage the tail light housing or crack the tail light lenses. Since the shell is preferably made of flexible material, it is extremely unlikely that the shell or the bulb and socket will become damaged. If the bulb was located in a flexible shell that was not protected by the housing, it is likely that the bulb would be broken whenever the shell was crushed. With many of the previous submersible tail lights, once the housing became damaged or the lens was cracked, the housing would leak and the submersible function of the tail light would be rendered inoperable. With the tail light of the present invention, the shell is protected from damage by the housing. If the lens of the housing becomes cracked or broken, the submersible feature of the tail light will remain operable. The bulb can be changed simply with the tail light of the present invention by removing the perforated plate 14, removing the screw 44 and removing the bracket 32 from the shell 4 to allow the bulb to be changed. The tail light can then be reassembled simply and quickly in the opposite manner. Preferably, any metal part, such as the screws, are made of stainless steel so that they will not rust.

The amount that the water will rise in the shell of a particular height will vary with the temperature differential between the ambient air and the water and the depth to which the shell is submerged. For example, where the air to water temperature differential is 15° C., the shell has a constant cross-section and the tail light is submerged to a depth of 4 feet, the following approximate measurements were noted:

(1) for a shell having a height of 4 inches, the water rose 0.6 inches within the shell;

(2) for a shell having a height of 5 inches, the water rose 0.75 inches within the shell; and (3) for a shell having a height of 6 inches, the water rose 0.9 inches within the shell.

The calculations for this example were based on the following equation:

$$\frac{P_1 V_1}{T_1} = \frac{P_2 V_2}{T_2}$$

where:

$P_1$ is the atmospheric pressure;

$V_1$ is the volume of air within the shell before immersion;

$T_1$ is the absolute temperature of the air within the shell before immersion;

$P_2$ is $P_1$ plus the water pressure at the depth to which the shell is submerged;

$V_2$ is the volume of air in the shell at the submerged level; and $T_2$ is the absolute temperature of the water or the temperature of the air in the shell when it is submerged.

While the actual temperature in the range of temperature differential causes differences in the distance that the water rises in the shell, the differences are insignificant and can be safely ignored.

What I claim as my invention is:

1. A submersible tail light for use on a boat trailer and the like, said tail light comprising:
    (a) a transparent inner shell having a top, sides, bottom and upper portion, said bottom being at least partially open to ambient air, said shell being formed in one piece of impervious material and being air-tight, except for the bottom, without the use of seals or adhesives;
    (b) a housing having a top, sides and bottom, said bottom being at least partially open to ambient air, said housing being large enough so that the shell will fit within it, said housing containing at least one lens; and
    (c) support means for supporting at least one bulb and socket together with fastening means to mount said bulb and socket within the upper portion of said shell and fastening means to mount said tail light on said trailer;

said socket being appropriately wired by wires extending from said socket through the bottom of said shell and the bottom of said housing, said bulb and socket being located sufficiently above said opening so that when said light is immersed in water, the air in said shell forms an air pocket in the upper portion thereof around said bulb and socket to prevent said bulb and socket from being immersed in said water.

2. A tail light as claimed in claim 1 wherein the tail light can be submersed in water and the bottom of the shell is covered by a plate containing numerous perforations to allow for the ingress and egress of water as the tail light is submersed and then removed from the water.

3. A tail light as claimed in claim 1 wherein the bottom of the shell is completely open.

4. A tail light as claimed in claim 1 wherein the support means is an L-shaped bracket which extends from the bottom of the shell to an upper portion of the shell, the bracket having an upper portion that supports a socket and bulb within the shell, the lower portion of the bracket having a suitable opening therein for receiving a screw to affix the bracket to the shell.

5. A tail light as claimed in claim 1 wherein the bulb and socket are located in said shell so that the bulb is centered on a lens of said housing.

* * * * *